United States Patent [19]
Bowerman

[11] Patent Number: 5,492,510
[45] Date of Patent: Feb. 20, 1996

[54] DIFFERENTIAL WITH EXTENDED PLANET GEARS HAVING MULTIPLE MESHING PORTIONS

[75] Inventor: Ward E. Bowerman, Rochester, N.Y.

[73] Assignee: Zexel Torsen Inc., Rochester, N.Y.

[21] Appl. No.: 327,027

[22] Filed: Oct. 21, 1994

[51] Int. Cl.⁶ .................................... F16H 48/10
[52] U.S. Cl. ........................................ 475/252
[58] Field of Search .............................. 477/252

[56] References Cited

U.S. PATENT DOCUMENTS

| | | | |
|---|---|---|---|
| 2,651,215 | 9/1953 | Schoenrock | 475/249 |
| 2,789,446 | 4/1957 | Schoenrock | 475/249 |
| 3,154,969 | 11/1964 | Saari | 475/227 |
| 3,494,226 | 2/1970 | Biddle | 475/249 |
| 3,706,239 | 12/1972 | Myers | 475/226 |
| 4,365,524 | 12/1982 | Dissett et al. | 475/226 |
| 4,677,876 | 7/1987 | Dissett | 475/226 |
| 5,055,096 | 10/1991 | Riemscheid et al. | 475/249 |
| 5,122,101 | 6/1992 | Tseng | 475/252 |
| 5,169,370 | 12/1992 | Dye et al. | 475/227 |
| 5,292,291 | 3/1994 | Ostertag | 475/252 |

FOREIGN PATENT DOCUMENTS 4013196  10/1991  Germany.

*Primary Examiner*—Dirk Wright
*Attorney, Agent, or Firm*—Eugene Stephens & Associates

[57] ABSTRACT

A parallel-axis gear differential includes one or more pairs of planet gears (68 and 70) for interconnecting two side gears (34 and 36). The planet gears (68 and 70) include at least three meshing portions (82, 84, and 88 and 94, 96, and 98). One of the meshing portions (82 or 96) of each planet gear (68 or 70) engages one of the side gears (34 or 36), and the other two meshing portions (84 and 88) of one planet gear (68) engage respective meshing portions (94 and 98) of its paired planet gear (70). The two planet-to-planet meshes (84/94 and 88/98) straddle one of the side gears (36), and the two side gears (34 and 36) straddle one of the planet-to-planet gear meshes (84/94). A spacer block (46) is positioned between the side gears (34 and 36).

30 Claims, 5 Drawing Sheets

DIFFERENTIAL WITH EXTENDED PLANET GEARS HAVING MULTIPLE MESHING PORTIONS

TECHNICAL FIELD

The invention relates to gear differentials having planetary gear sets mounted in a housing for connecting an input shaft to a pair of relatively rotatable output shafts.

BACKGROUND

Gear differentials used in automobiles include a planetary gear set carried within a differential housing. The planetary gear set interconnects a pair of output drive shafts for opposite directions of rotation with respect to the housing. An input drive shaft is connected to the housing for rotating the housing about a common axis of the output shafts.

In most automotive differentials, the planetary gearing interconnects the output shafts at a speed ratio of minus one. At such a speed ratio, a single rotation of one output shaft with respect to the housing produces a single rotation of the other output shaft in an opposite direction with respect to the housing. In this way, the two output shafts can rotate at different speeds, which average to the rotational speed of the housing.

While rotating at such different speeds (i.e., differentiating), input torque is divided between output shafts in accordance with the efficiency of the planetary gear interconnection. A ratio of the torques between two relatively rotating output shafts is referred to as "bias ratio". The same ratio of torques (or a little larger) is required to initiate differentiation. Bias ratios of two-to-one or more make better use of traction under uneven traction conditions by preventing one wheel from spinning until additional torque distributed to the higher traction wheel reaches the bias ratio.

The planetary gear sets that support bias ratios of two-to-one or more must be of rugged construction to operate at reduced efficiencies. Most friction is generated between the planetary gears and their mounting surfaces. Special care is taken to distribute bearing loads throughout the differentials to avoid producing excessive wear or strain on any one part.

Sun gear members of the planetary gear sets, also referred to as "side" gears, are coupled to inner ends of the two output shafts. Planet gear members of the same sets, also referred to as "element", "spider", or "combination" gears, operatively interconnect the two sun gears for opposite directions of differentiation.

One well-known arrangement of planetary gearing positions side and planet gears within the housing for rotation about axes that extend parallel to each other. Differentials with this type of gearing arrangement are referred to as "parallel-axis" gear differentials. The planet gears of these differentials are generally mounted in pairs. One meshing portion of each planet gear engages one of the side gears, and another meshing portion of each planet gear engages its paired planet gear.

The planet gears are individually supported for rotation on shafts that project from opposite ends of the planet gears or within pockets formed in the housing. Bores formed in the housing provide bearings for the shafts. Alternatively, the pockets provide bearings for supporting outside cylinder surfaces of the planet gears, including top lands of the planet gear teeth.

An example of a parallel-axis gear differential having planet gears mounted in pockets is disclosed in U.S. Pat. No. 4,677,876. The side gears are axially separated by a space within which the paired planet gears are engaged in mesh. The space between side gears also provides access for fastening ends of the output shafts within the differential with C-clips. A spacer bar holds the output shafts apart after the C-clips are fastened.

A commonly assigned U.S. Pat. No. 5,122,101 discloses an example of a parallel-axis gear differential in which the planet gears are formed by two gear sections joined by a stem. One of the gear sections has a first meshing portion engaged with one of the side gears and a second meshing portion engaged with its paired planet gear. The other gear section has a third meshing portion that is also engaged with its paired planet gear. The two meshes between the paired planet gears straddle the two meshes between the paired planet gears and the side gears. The additional gear meshes between planet gears provide for more balanced loading throughout the differential.

Ordinarily, the side gears are positioned together between the straddled planet gear meshes. However, commonly assigned U.S. Pat. No. 5,292,291 provides for separating the side gears of similar planetary gearing by extending the stem sections of the planet gears. The space between side gears is used for either fastening ends of the output shafts within the differential or connecting a coaxial input shaft to the differential housing.

However, the extended stem sections, which have a smaller diameter than the meshing portions, can weaken the planet gears, especially in torsion. The maximum diameter of the stem sections is equal to the root diameter of the adjacent meshing portions to avoid interference with the side gear teeth. Also, gear blanks with extended stem sections are more susceptible to heat treatment distortions, which produce bending in the gear blanks.

SUMMARY OF THE INVENTION

My invention in one or more of its embodiments can improve gear differentials by better managing loading between the gearing, increasing gear bearing areas, strengthening individual gears, improving circulation of lubricant, and maintaining space within the differential for fastening output shafts or coupling a coaxial input shaft within the differential housing.

One example of my invention includes a housing rotatable about a pair of drive shafts sharing a common axis of rotation. A pair of first and second side gears is positioned in the housing for receiving ends of the drive shafts for rotation with them about the common axis. At least one pair of first and second planet gears is also positioned in the housing for rotation about axes that extend parallel to the common axis.

Each of the planet gears includes a first meshing portion in engagement with one of the side gears and second and third meshing portions in engagement with respective meshing portions of its paired planet gear. The engaged second and third meshing portions of the planet gears straddle the second side gear along the common axis, and the first and second side gears straddle the engaged second meshing portions of the planet gears along the common axis. This latter feature spaces the side gears apart along the common axis through a distance that encompasses an effective face width of the engaged second meshing portions.

The first and second meshing portions of the first planet gear are preferably contiguous, whereas the second and third meshing portions of the first planet gear are preferably separated by a stem having an outer diameter that is smaller than an outer diameter of the second and third meshing portions. The second meshing portion replaces the extended stem portion of prior straddle planet gears used with separated side gears. The larger outer diameter of the second meshing portion with respect to the stem strengthens my new planet gears over the prior planet gears with extended stems. The exposed meshing area between side gears also helps to circulate lubricant to other meshing areas within the differential.

Another example of my invention includes a similar housing and a pair of first and second side gears that are rotatable about a common axis. The side gears are interconnected by at least one pair of first and second planet gears that are rotatable about respective axes. Each of the planet gears includes a first meshing portion in engagement with one of the side gears and second, third, and fourth meshing portions in engagement with the respective meshing portions of its paired planet gear. The second, third, and fourth meshing portions of each planet gear are separated from each other along the respective axes of planet gear rotation.

For instance, the first meshing portion of the first planet gear separates its second and fourth meshing portions, and the first meshing portion of the second planet gear separates its second and third meshing portions. Stems separate the second and third meshing portions of the first planet gear and the second and fourth meshing portions of the second planet gear.

Outer diameter surfaces of the planet gears are rotationally supported in pockets. The additional meshing portion between planet gears lowers tooth loading in the other meshing portions and provides an additional bearing surface for better distributing gear mounting loads within the housing.

DRAWINGS

FIG. 4 is a similar diagram of an alternative gearing configuration that could be used for the practice of my invention.

DETAILED DESCRIPTION

Figure 1:
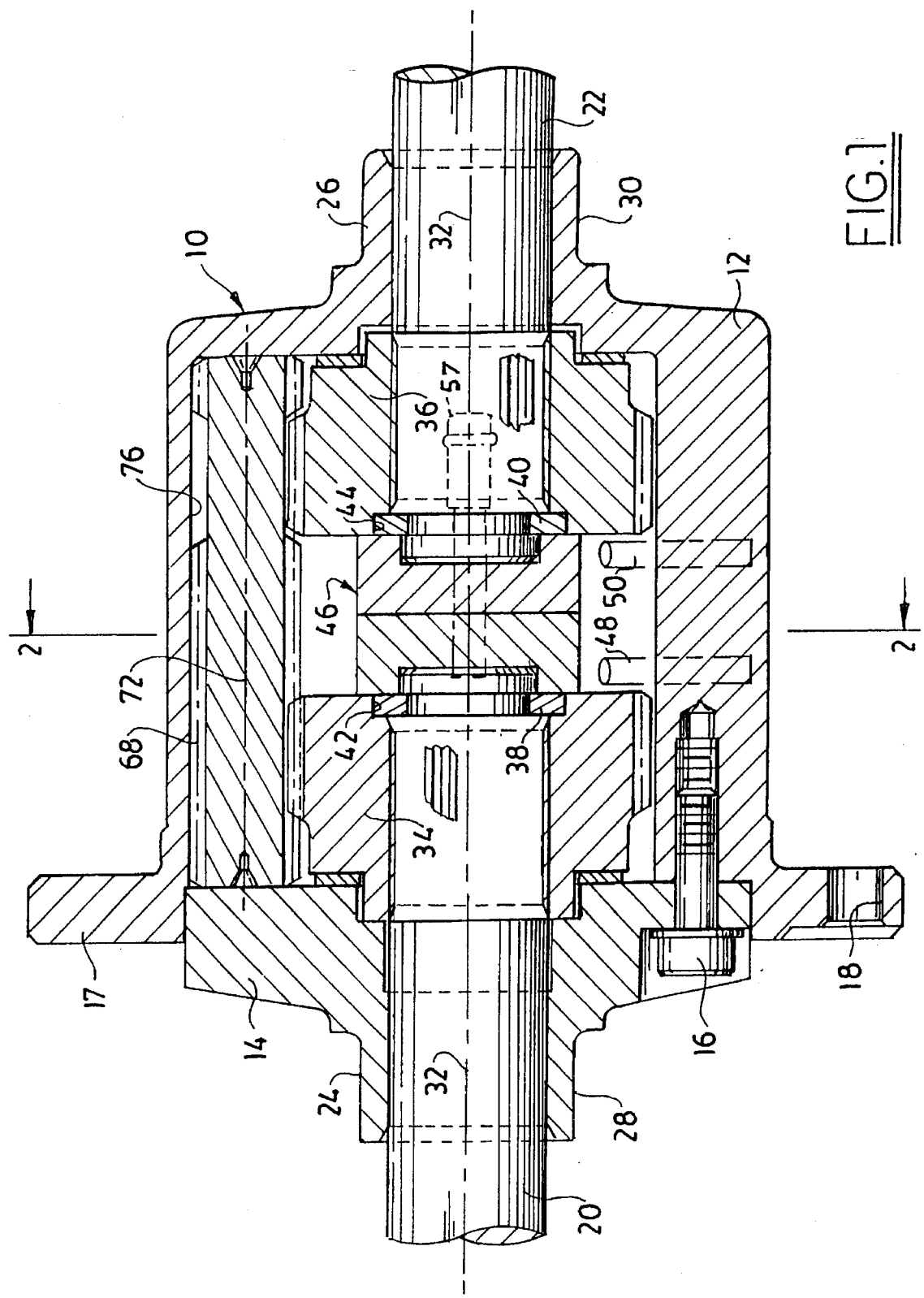
FIG. 1 is a longitudinal sectional view of one example of my invention in which inner ends of output drive shafts are trapped within the differential. The view is taken along line 1—1 of FIG. 2.
Figure 2:
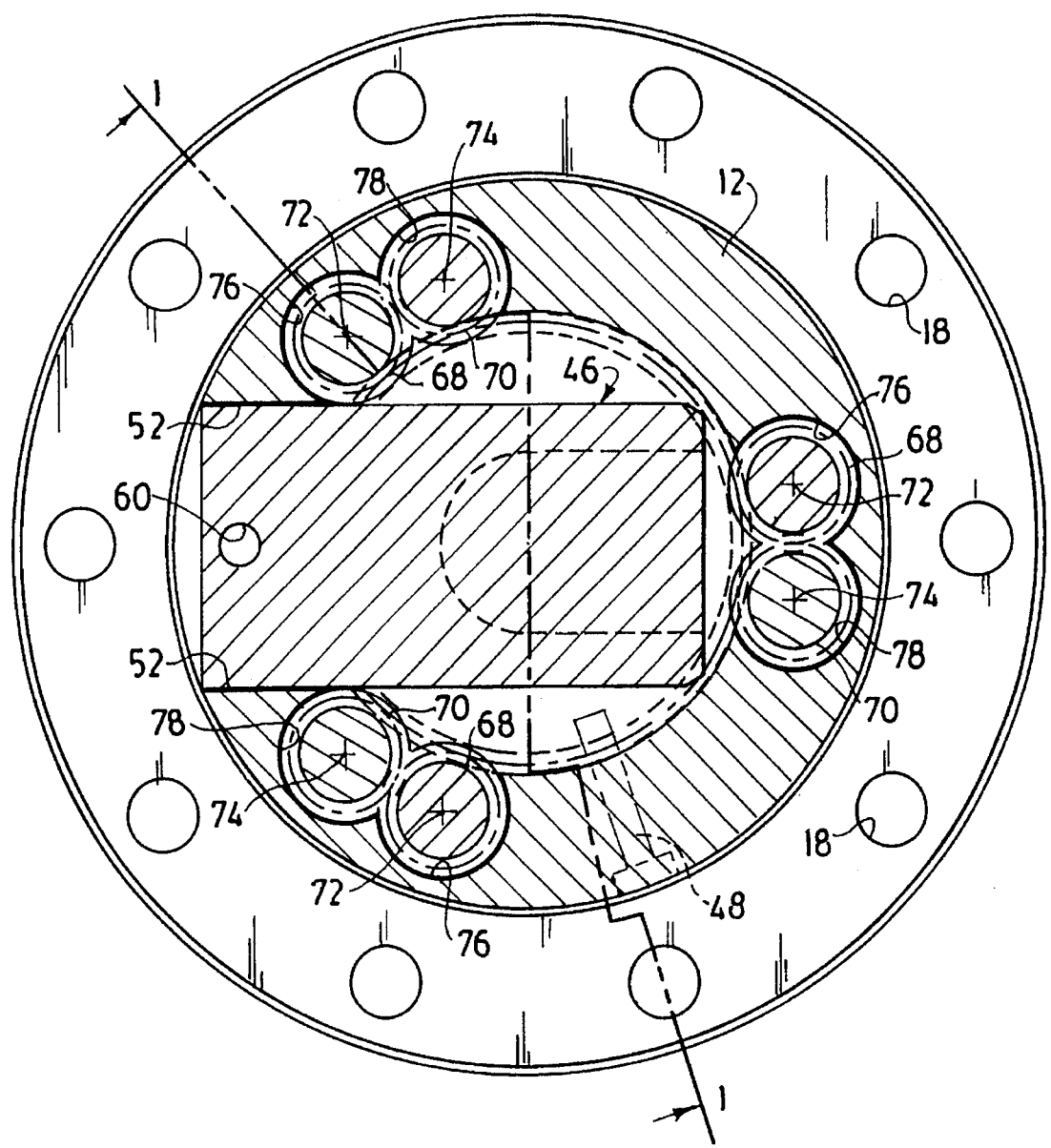
FIG. 2 is a traverse sectional view taken along line 2—2 of FIG. 1 showing three pairs of planet gears and a space between the pairs for receiving a spacer block.

My new differential as illustrated in the drawing figures has a housing 10 that is assembled from a main body 12 and an end cap 14. Bolts 16 attach the end cap 14 to the main body 12. A flange 17 is provided with holes 18 to attach a ring gear (not shown) for transmitting drive power to the housing 10. A pair of output drive shafts 20 and 22 are received through trunnions 24 and 26 at opposite ends of the housing 10. The trunnions 24 and 26 have journals 28 and 30 for rotating the housing 10 within a vehicle chassis (not shown) about a common axis 32 of the output shafts 20 and 22.

Inner ends of the output shafts 20 and 22 are splined to respective first and second side gears 34 and 36. In addition, removable locking elements, which are formed as so-called "C-lock" washers 38 and 40, capture the inner ends of the output shafts 20 and 22 within side gear recesses 42 and 44. A two-piece spacer block 46 further restricts axial movement of the inner ends of the output shafts 20 and 22 between the side gears 34 and 36.

The C-lock washers 38 and 40 are attached to the inner ends of the output shafts 20 and 22 before the spacer block 46 is positioned within the housing 10. Pins 48 and 50 hold the two side gears 34 and 36 apart while the inner ends of the output shafts 20 and 22 are shifted one at a time into the space between the side gears 34 and 36. A window 52 formed through the main body 12 provides access for attaching the C-lock washers 38 and 40 to the inner ends of the output shafts 20 and 22.

Figure 3:
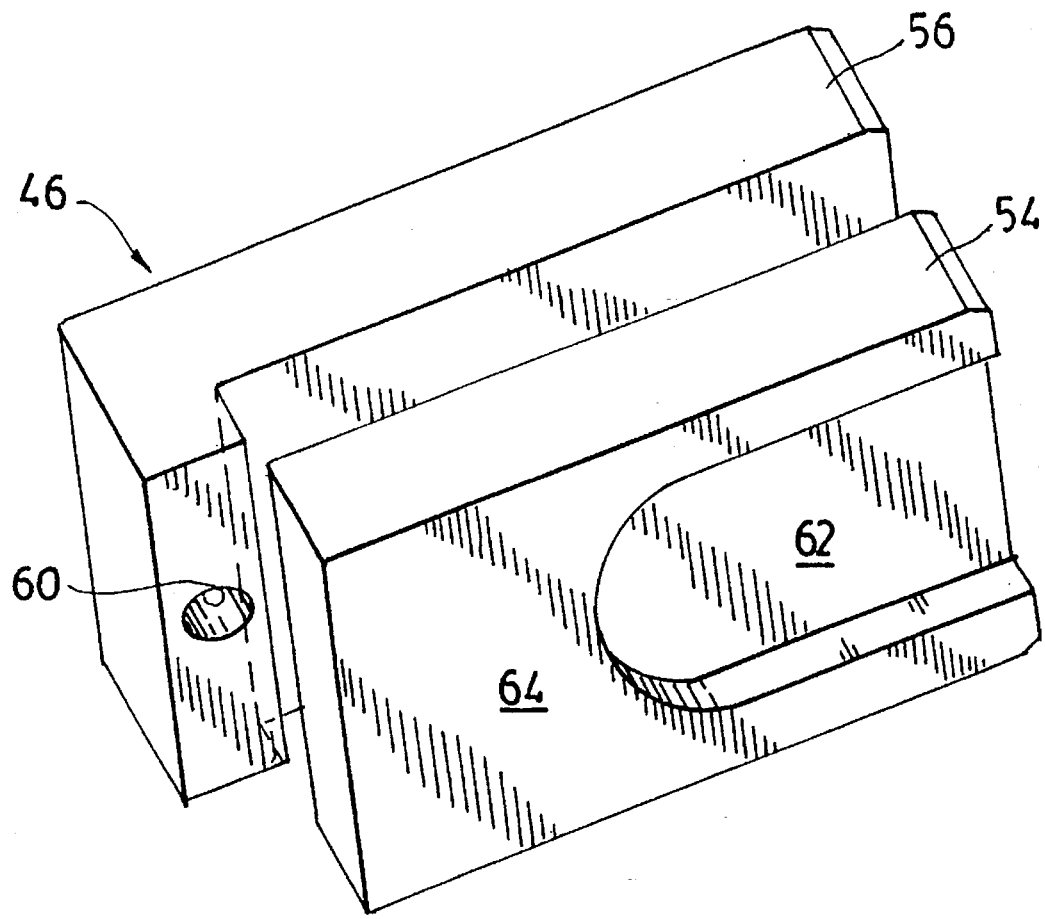
FIG. 3 is an isometric view of the spacer block.

The spacer block 46, as best seen in FIG. 3, is split into two halves 54 and 56 to avoid interference with the ring gear (not shown). The spacer half 54 is inserted through the window 52 first, followed by the spacer half 56. A retaining bolt 57 is inserted through a hole 60 in the spacer half 56 into engagement with the main body 12 to secure both spacer halves 54 and 56 within the main body 12. Each of the two spacer halves 54 and 56 has separate thrust surfaces 62 and 64 for respectively restricting axial movements of the output shafts 20 and 22 and the side gears 34 and 36. The thrust surfaces 64 of the spacer halves 54 and 56 separate the side gears 34 and 36 more than the pins 48 and 50 to prevent the pins from being loaded during operation of the differential.

The side gears 34 and 36 are interconnected by three pairs of planet gears 68 and 70 that are rotatable about respective axes 72 and 74 that extend parallel to the common axis 32. Outer diameter surfaces of the planet gears 68 and 70 are rotatably supported by bearing surfaces 76 and 78 that are formed as pockets in the main body 12.

Figure 4:
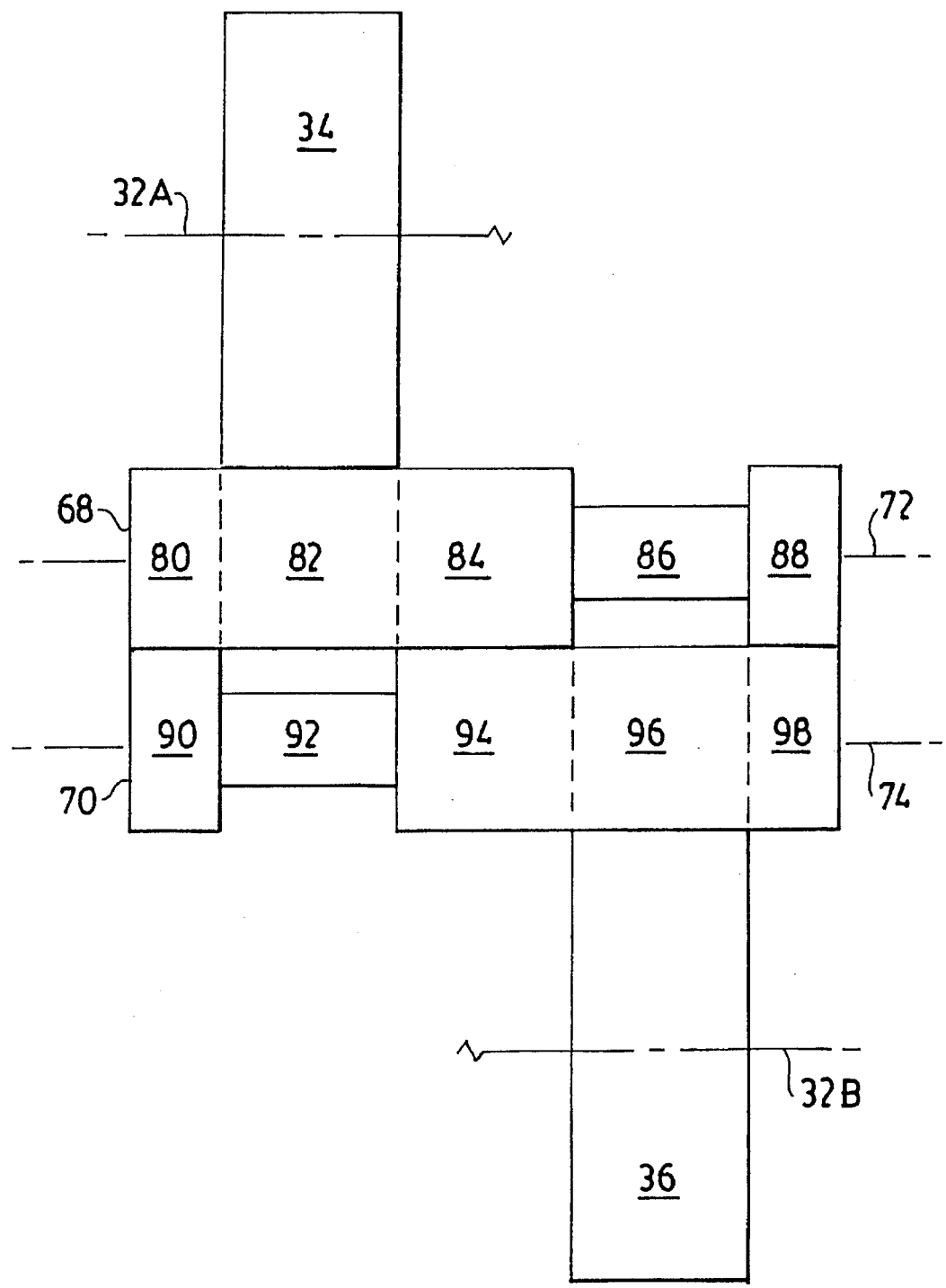
FIG. 4 is a diagrammatic representation of the gearing in the preceding figures with the individual gears rotated in mesh out of their mounting positions into a common axial plane.

A layout of one of the pairs of planet gears 68 and 70 in mesh with the side gears 34 and 36 is shown in FIG. 4. In the view of FIG. 4, the common axis 32 has been split into two halves 32A and 32B to enable the side gears 34 and 36 to be rotated in mesh with the planet gears 68 and 70 into a common axial plane.

The planet gear 68 includes four meshing portions 80, 82, 84, and 88 and a stem portion 86; and the planet gear 70 includes four meshing portions 90, 94, 96, and 98 and a stem portion 92. The three meshing portions 80, 82, and 84 of the planet gear 68 form a contiguous gear section that is joined to the remaining meshing portion 88 by the stem portion 86. The meshing portion 90 of the planet gear 70 is joined to the contiguous remaining gear sections 94, 96, and 98 by the stem portion 92. The stem portions 86 and 92 have smaller diameters than their adjacent meshing portions to prevent interference with respective side gears 36 and 34.

The meshing portion 82 of the planet gear 68 is distinguished from its adjacent meshing portions 80 and 84 by its meshing engagement with the side gear 34. Similarly, the meshing portion 96 of the planet gear 70 is distinguished from its adjacent meshing portions 94 and 98 by its meshing engagement with the side gear 36. The three meshing portions 80, 84, and 88 of the planet gear 68 engage the three meshing portions 90, 94, and 98 of its paired planet gear 70 along distinct regions of the common axis 32A and 32B.

For example, the engaged meshing portions 80/90 and 84/94 straddle the side gear 34 and the engaged meshing portions 84/94 and 88/98 straddle the side gear 36. The side gears 34 and 36, in turn, straddle the engaged meshing portions 84/94. The side gears 34 and 36 are preferably spaced apart along the common axis 32A and 32B through a distance that encompasses an effective face width of the engaged meshing portions 84/94. The effective face width is equal to the length of overlap between mating gear teeth in an axial plane.

The engaged meshing portions 84/94 use the additional space between the side gears 34 and 36 to increase the total amount of effective face width between the planet gears 68 and 70. This reduces the amount of stress at the two other engaged meshing portions 80/90 and 88/98. Outer diameter surfaces of the meshing portions 84 and 94 provide additional journal areas against the bearing surfaces 76 and 78 for reducing planet gear mounting stresses within the main body 12. The meshing portions 84 and 94 can also be used in place of the pins 48 and 50 for holding the side gears 34 and 36 apart during assembly of the C-lock washers 38 and 40.

Figure 5:
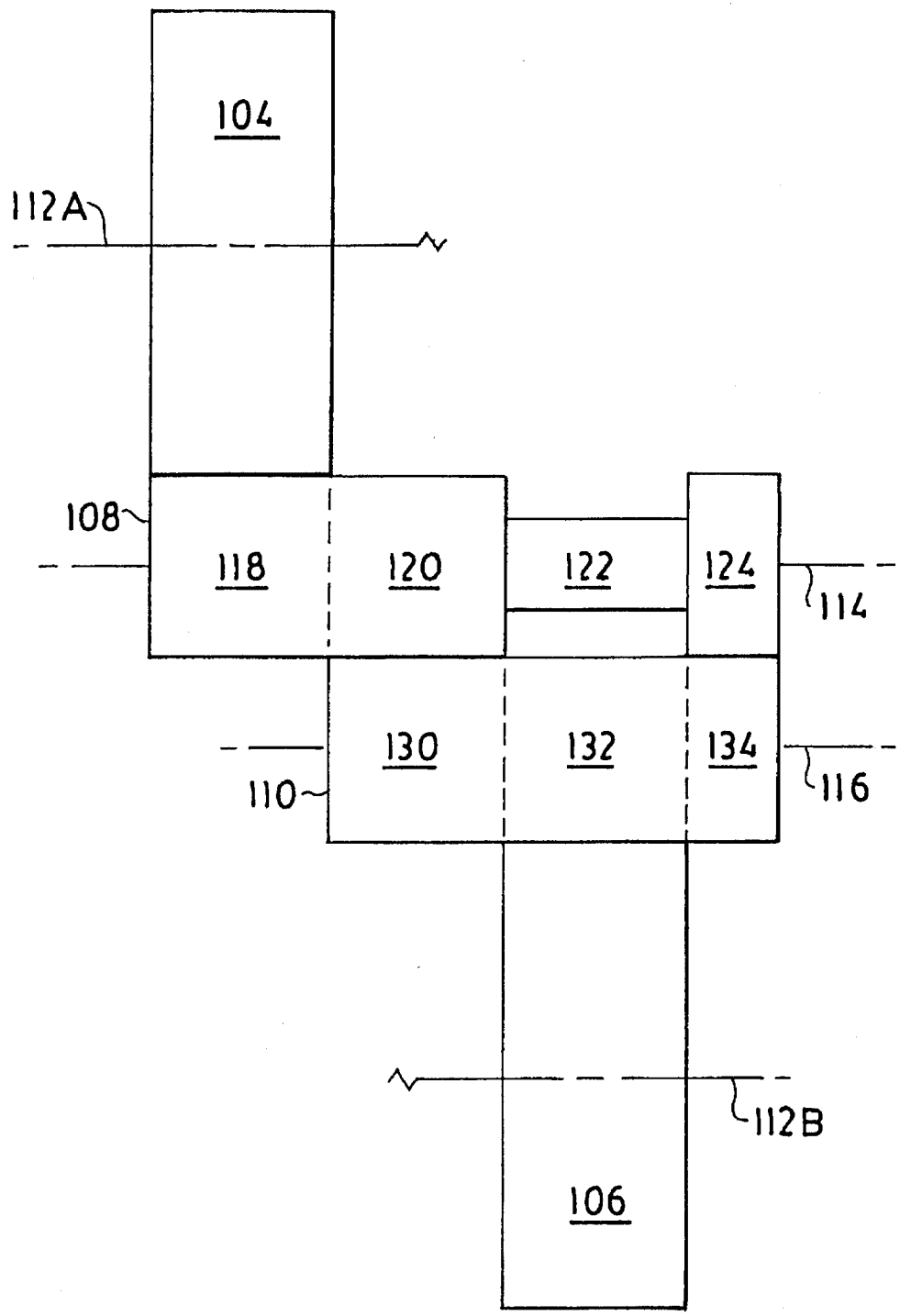

FIG. 5 is a similar layout of an alternative gearing configuration. Side gears 104 and 106 are rotatable about a common axis that is split for purposes of illustration into two halves 112A and 112B. Planet gears 108 and 110, which are rotatable about respective parallel axes 114 and 116, interconnect the two side gears 104 and 106 for rotation in opposite directions.

In contrast to the preceding embodiment, the planet gears 108 and 110 include only three meshing portions and only one of the planet gears has a stem portion. The planet gear 108 includes three meshing portions 118, 120, and 124 and a stem portion 122. The meshing portions 118 and 120 are contiguous with each other but are separated from the meshing portion 124 by the stem portion 122. The planet gear 110 has three contiguous meshing portions 130, 132, and 134.

The meshing portion 118 of the planet gear 108 engages in mesh with the side gear 104, and the meshing portion 132 of the planet gear 110 engages the side gear 106. The remaining meshing portions 120 and 124 of the planet gear 108 respectively engage the meshing portions 130 and 134 of the planet gear 110 along distinct regions of the common axis 112A and 112B. For example, the two engaged meshing portions 120/130 and 124/134 between the planet gears 108 and 110 straddle the side gear 106, and the two side gears 104 and 106 straddle the engaged meshing portions 120/130.

In contrast to conventional parallel-axis gear differentials, the alternative gearing configuration of FIG. 5 provides an additional planet gear-to-planet gear mesh for better distributing loading. Similar benefits can be obtained by applying my invention to a variety of other gearing configurations. For example, copending U.S. application Ser. No. 08/036,444, filed 24 Mar. 1993, and hereby incorporated by reference, discloses planet gears arranged in groups of three or four instead of pairs. The additional planet-to-planet meshes would be particularly helpful for transmitting the higher loads of the middle planet gears of the groups. The planet gears within each group could be different sizes, and the contiguous meshing portions could be divided into two or more different gear designs. One such example is disclosed in coassigned U.S. Pat. No. 5,169,370, which is hereby incorporated by reference.

The housing configuration for mounting the new gearing could also vary greatly. For example, the housing could be made with a main body and two end caps, or the housing could be divided into two halves that are split between the side gears or nearer either end. Fixed or pivotable pedestals could also be used to mount the planet gears as disclosed in copending U.S. application Ser. No. 08/058,480, filed on 6 May 1993, and hereby incorporated by reference. Instead of driving the housing through a ring gear, a spacer block could be formed as a driving block for coupling a coaxial input shaft inside the housing. An example of this is disclosed in coassigned U.S. Pat. No. 5,292,291, which is also hereby incorporated by reference.

I claim:

1. A parallel-axis differential gear assembly comprising:

a housing rotatable about a pair of drive shafts sharing a common axis of rotation;

a pair of first and second side gears positioned in said housing for receiving ends of the respective drive shafts for rotation therewith about the common axis;

at least one pair of first and second planet gears positioned in said housing for rotation about respective axes that extend parallel to the common axis;

each of said planet gears including a first meshing portion in engagement with one of said side gears and second and third meshing portions in engagement with respective meshing portions of its paired planet gear;

said engaged second and third meshing portions of the planet gears straddling said second side gear along the common axis; and said first and second side gears straddling the engaged second meshing portions of the planet gears along the common axis.

2. The gear assembly of claim 1 in which said side gears are spaced apart along the common axis through a distance that encompasses an effective face width of said engaged second meshing portions.

3. The gear assembly of claim 2 in which said second and third meshing portions of the first planet gear are interconnected by a stem having an outer diameter that is smaller than an outer diameter of said second and third meshing portions of the first planet gear.

4. The gear assembly of claim 2 in which said first and second meshing portions of the first planet gear are contiguous.

5. The gear assembly of claim 4 in which said first, second, and third meshing portions of the second planet gear are contiguous.

6. The gear assembly of claim 1 in which each of said planet gears includes a fourth meshing portion in engagement with a respective meshing portion of its paired planet gear.

7. The gear assembly of claim 6 in which said engaged second and fourth meshing portions of the planet gears straddle said first side gear along the common axis.

8. The gear assembly of claim 7 in which said second and third meshing portions of the first planet gear are interconnected by a first stem having an outer diameter that is smaller than an outer diameter of said second arid third meshing portions of the first planet gear, and said second and fourth meshing portions of the second planet gear are interconnected by a second stem having an outer diameter that is smaller than an outer diameter of said second and fourth meshing portions of the second planet gear.

9. The gear assembly of claim 7 in which said engaged third and fourth meshing portions of the planet gears straddle both of said side gears along the common axis.

10. The gear assembly of claim 9 in which said first meshing area of the first planet gear is contiguous to said second and fourth meshing areas of the first planet gear, and said first meshing area of the second planet gear is contiguous to said second and third meshing areas of the second planet gear.

11. The gear assembly of claim 1 in which each pair of planet gears includes two planet gear-to-side gear meshes and two planet gear-to-planet gear meshes that are distributed along distinct regions of the common axis.

12. The gear assembly of claim 11 in which:
   a first of said regions is defined by the engagement of the first meshing portion of the first planet gear with the first side gear,
   a second of said regions is defined by the engagement of the first meshing portion of the second planet gear with the second side gear,
   a third of said regions is defined by the engagement of the second meshing portions of the first and second planet gears, and
   a fourth of said regions is defined by the engagement of the third meshing portions of the first and second planet gears.

13. The gear assembly of claim 12 in which said second region is located between said third and fourth regions, and said third region is located between said first and second regions.

14. The gear assembly of claim 13 in which each of said planet gears includes a fourth meshing portion in engagement with a respective meshing portion of its paired planet gear.

15. The gear assembly of claim 14 in which a fifth distinct region is defined along the common axis by the engagement of the fourth meshing portions of the first and second planet gears.

16. The gear assembly of claim 15 in which said first region is located between said third and fifth regions.

17. The gear assembly of claim 1 in which said side gears are separated by a spacer that provides for separating the inner ends of the two drive shafts.

18. The gear assembly of claim 17 in which a window is formed through an exterior of said housing for inserting and removing said spacer.

19. The gear assembly of claim 1 further comprising at least one pair of pockets supporting outer diameter surfaces of said planet gears for rotation about their respective axes.

20. The gear assembly of claim 19 in which each of said pockets includes a bearing surface for supporting the outer diameter surfaces of said second and third meshing portions.

21. A differential comprising:
   a housing rotatable about a pair of drive shafts sharing a common axis of rotation;
   a pair of first and second side gears positioned in said housing for receiving ends of the respective drive shafts for rotation therewith about the common axis;
   at least one pair of first and second planet gears positioned in said housing for rotation about respective axes and operatively connecting said side gears for opposite directions of relative rotation;
   each of said planet gears including a first meshing portion in engagement with one of said side gears and second, third, and fourth meshing portions in engagement with the respective meshing portions of its paired planet gear; and
   said second, third, and fourth meshing portions being separated from each other along the respective axes of planet gear rotation.

22. The differential of claim 21 in which said first meshing portion of the first planet gear separates said second and fourth meshing portions of the first planet gear along its axis.

23. The differential of claim 22 in which said first meshing portion of the second planet gear separates said second and third meshing portions of the second planet gear along its axis.

24. The differential of claim 23 in which said second and third meshing portions of the first planet gear are separated along its axis by a stem having an outer diameter smaller than an outer diameter of said second and third meshing portions of the first planet gear.

25. The differential of claim 24 in which said second and fourth meshing portions of the second planet gear are separated along its axis by a stem having an outer diameter smaller than an outer diameter of said second and fourth meshing portions of the second planet gear.

26. The differential of claim 25 in which said third and fourth meshing portions of each planet gear are separated by said first and second meshing portions of each planet gear.

27. The differential of claim 21 further comprising at least one pair of pockets supporting outer diameter surfaces of said planet gears for rotation about their respective axes.

28. The differential of claim 27 in which each of said pockets includes a bearing surface for supporting the outer diameter surfaces of said second, third, and fourth meshing portions.

29. The differential of claim 21 in which said side gears are separated along the common axis through a distance at least equal to an effective face width of said engaged second meshing portions of the planet gears.

30. The differential of claim 29 in which said side gears are separated by a spacer.

* * * * *